Aug. 20, 1963    R. L. SULLIVAN    3,101,104
SAFETY DEVICE FOR SAWS
Filed March 29, 1961

INVENTOR.
ROBERT SULLIVAN
BY
ATTORNEYS 3,101,104
SAFETY DEVICE FOR SAWS
Robert Leo Sullivan, Nutley, N.J., assignor to Weyerhaeuser Company, Tacoma, Wash., a corporation of Washington
Filed Mar. 29, 1961, Ser. No. 99,109
14 Claims. (Cl. 143—159)

This invention relates to a device for holding a piece of material on a saw table and also preventing it from being ejected rearwardly of the saw. Such a device is known as a hold-down and anti-kickback guard.

It is desirable to use this type of device on power saws since there is a tendency for the saw to eject the material either upwardly or rearwardly during operations, thus creating a potential hazard to the operator or others in the proximity of the machine.

It is, therefore, an object of the present invention to provide a device which will prevent material from being ejected either upwardly or rearwardly of the saw.

It is also an object of this invention to provide a safety device that may readily be placed on a table saw.

It is a further object of this invention to provide a safety device of simple construction, inexpensive to manufacture and having ease of operation.

These and other objects will become readily apparent upon a reading of the following specification in conjunction with the attached drawings.

Figure 1:
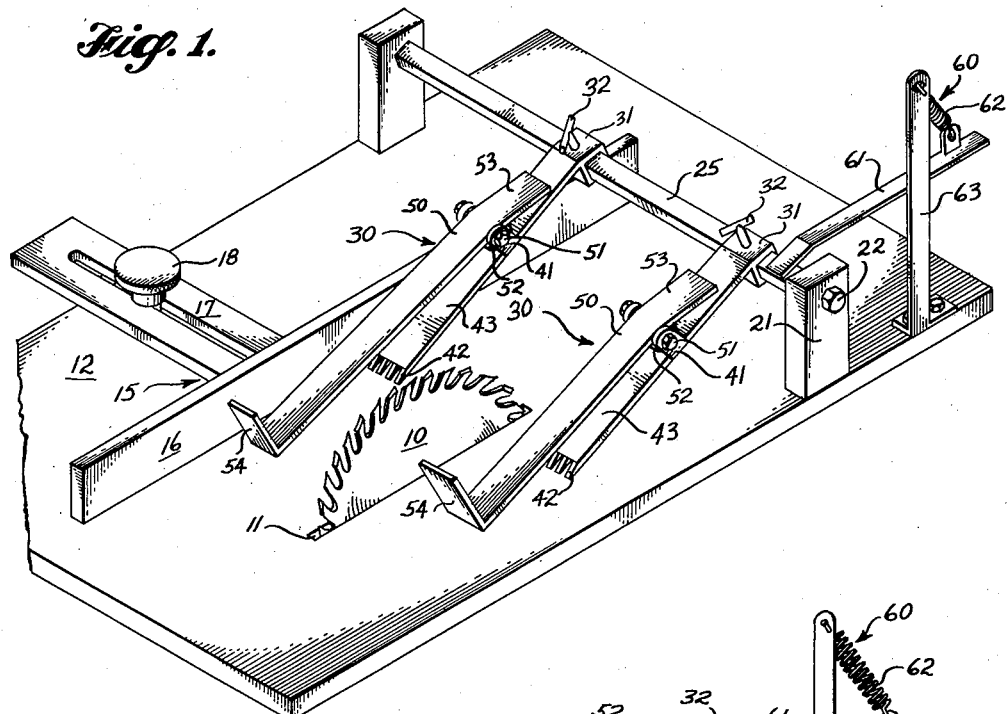
FIGURE 1 is an isometric view of the inventive apparatus in conjunction with a table saw.
Figure 2:
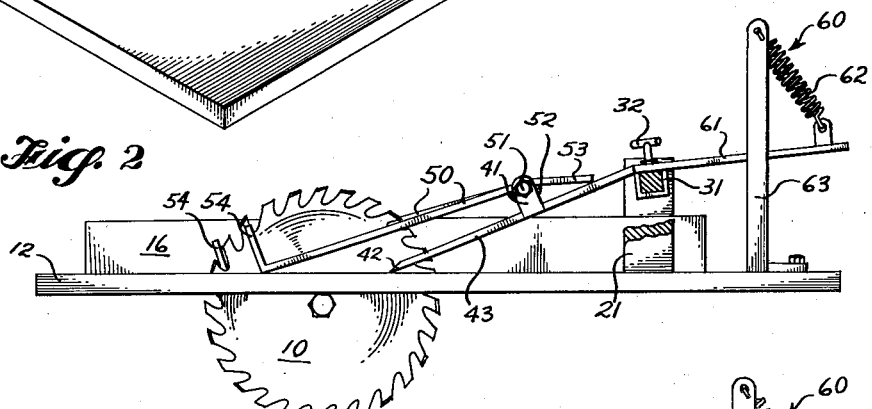
FIGURE 2 is a side elevational view of the apparatus with portions cut away to show details of the apparatus.

The drawings show a table saw having blade 10 projecting through a slot 11 in a table 12. A moveable work guide 15, having a guide member 16 and a slotted positioning bracket 17, is mounted on table 12. The guide 15 may be moved toward or away from the saw depending on the width of material to be cut, and is locked in place by a locking screw 18 projecting through the slot in bracket 17.

An anti-kickback device 20 is also mounted on table 12. This device has a pair of standards 21 that are bolted, clamped or otherwise affixed to table 12, a shaft 25 rotatably mounted in apertures at the upper ends of standards 21, an anti-kickback and hold-down assembly 30 fixedly mounted on shaft 25, and a spring system 60 for biasing assembly 30 toward table 12. One or more kickback assemblies 30 may be mounted on the shaft 25 for engagement with the work piece. In the preferred embodiment illustrated in the drawing two such assemblies 30 are used, one on either side of the saw blade 10.

Anti-kickback assembly 30 should be fixedly mounted on shaft 25 so that there will be no relative rotation between assembly 30 and shaft 25. In the embodiment illustrated, the shaft has a square cross section and the assembly 30 is fixed to the shaft by a ring 31 having the configuration of the cross section of the shaft. Sidewise movement of assembly 30 is prevented by set screws 32 which secure rings 31 to shaft 25, and lock nuts 22 which prevent endwise movement of the shaft.

Anti-kickback assembly 30 comprises a grip arm 43 integral with ring 31 and a hold-down arm 50, rotatably mounted on the upper portion of arm 43. The mounting comprises a pinion 51 extending through apertures in lugs 41, integral with arm 43, and 52, integral with arm 50. The relative rotation between arms 43 and 50 is fixed by segment 53 of arm 50, above lug 52, which is bent inwardly toward arm 43 to form a stop member.

Figure 3:
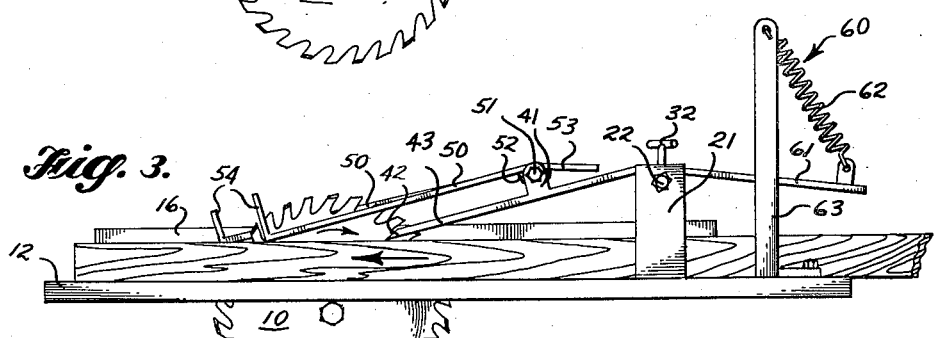
FIGURE 3 is a side elevational view of the apparatus illustrating the relationship of various parts during operation.

As shown in FIGURE 3, the arms 43 and 50 will ride on top of the material as the material is moving through the saw. If the material is kicked back by the saw, the arms will act in a number of ways to prevent this kickback or rearward ejection. The precise action depends on the exact location of the material with respect to assembly 30.

Figure 4:
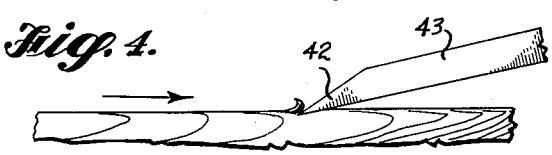
FIGURE 4 is a fragmentary view illustrating the method of preventing kickbacks.

Should the material be underneath arm 43, then the rearward movement of the material will be stopped by teeth 42 at the lower end of the arm which dig into the material, preventing such movement. This action is shown in FIGURE 4.

Should the material be underneath arm 50 only, then the rearward movement of the material will again be stopped by arm 43 which is in the path of such movement. If arm 43 is suspended above the table 12, teeth 42 will bite into the end of the material, stopping its movement. If arm 43 is laying on table 12 then the material will ride up on the upper surface of arm 43 and the rearward movement of the material will be stopped by arm 50. The relative rotation between the two arms is a determining factor in stopping this movement.

Should the material have passed from underneath both arms 43 and 50, then its rearward ejection is stopped by up-standing member 54 of arm 50. Preferably, this member is perpendicular to arm 50 so that it will tilt forwardly when resting on table 12 preventing the material from being thrown upwardly.

Arm 50 also holds the material on the table against the tendency of the saw to raise the material from the table. The curved surface at the juncture of arm 50 and member 54 provides a roller surface for smooth riding on the surface of the work piece.

In all of these actions it is necessary for assembly 30 to be biased toward the table so that it exerts a forward and downward pressure on the material. This biasing force is illustrated as being applied by spring system 60 comprising a rearwardly extending arm 61, fixedly mounted to shaft 25, connected by a tension spring 62 to an upright shaft 63, fixedly mounted on table 12. As shown, the outer end of arm 61 which extends rearwardly of shaft 63, is connected to the upper end of shaft 63 which is above arm 61. This system biases the shaft 25 and assembly 30 in a counterclockwise direction.

The material may be released from engagement with the assembly 30 by downward pressure on arm 61, raising assembly 30 from the material.

While specific details of preferred embodiments have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. An anti-kickback device for table saws comprising upright standards, a shaft rotatably mounted on said standards, a first arm fixedly mounted on said shaft, the end of said arm opposite said shaft having means for engaging a piece of material, a second arm rotatably mounted to the upper surface of said first arm and extending outwardly of said first arm, means for fixing the maximum amount of upward rotation of said second arm with respect to said first arm, means for biasing said arms downwardly.

2. The apparatus of claim 1 in which said second arm has an upright member attached to its outwardly extending end.

3. The apparatus of claim 1 in which said means for biasing said arms downwardly comprises a spring system.

4. The apparatus of claim 3 in which said spring system comprises an upright standard spaced from said shaft on the side opposite said first and second arms, a third arm fixedly mounted on said shaft and extending from said shaft on the side opposite said first and second arms, said third arm extending beyond said last mentioned standard, a tension spring connecting the upper end of said last mentioned standard to the outer end of said third arm.

5. The apparatus of claim 1 in which said means for fixing a maximum amount of rotation comprises a stop member.

6. The apparatus of claim 1 in which the mounting for the second arm is between said shaft and the outer end of said first arm.

7. An anti-kickback device for table saws comprising a pair of upright standards, a shaft rotatably mounted on said standards, a first arm fixedly mounted on said shaft and extending downwardly thereof, the end of said first arm opposite said shaft having teeth thereon, a second arm rotatably mounted to the upper surface of said first arm between said shaft and the outer end of said first arm and extending outwardly of said first arm, means fixing a maximum amount of upward rotation of said second arm with respect to said first arm, means for biasing said arms downwardly.

8. The apparatus of claim 7 in which said means for biasing said arms downwardly comprises a spring system.

9. The apparatus of claim 8 in which said spring system comprises an upright standard spaced from said shaft and on the side opposite said first and second arms, a third arm fixedly mounted on said shaft and extending from said shaft on the side opposite said first and second arms, said third arm extending beyond said last mentioned standard, a tension spring connecting the upper end of said last mentioned standard to the outer end of said third arm.

10. A saw having an anti-kickback device comprising a saw, means for supporting material movable with respect to said saw, a shaft extending transversely of said saw, means positioning said shaft with respect to said saw, a first arm mounted on said shaft, said first arm being rotatable in a plane transversely of the axis of said shaft, the end of said first arm opposite said shaft having means for engaging a piece of material, a second arm rotatably mounted to the upper surface of said first arm and extending outwardly of said first arm, means for fixing the maximum amount of upward rotation of said second arm with respect to said first arm, and means for biasing said first arm toward said supporting means.

11. The apparatus of claim 10 in which said second arm has an upright member attached to its outwardly extending end.

12. The apparatus of claim 10 in which said means for biasing said arm downwardly comprises a spring system.

13. The apparatus of claim 10 in which said means for fixing a maximum amount of rotation comprises a stop member.

14. The apparatus of claim 10 in which the mounting for the second arm is between said shaft and the outer end of said first arm.

References Cited in the file of this patent
UNITED STATES PATENTS

| | | |
|---|---|---|
| 1,356,110 | Neal | Oct. 19, 1920 |
| 1,600,604 | Sorlien | Sept. 20, 1926 |
| 2,679,871 | Ford | June 1, 1954 |
| 2,721,587 | Dremel | Oct. 25, 1955 |
| 2,880,769 | Platakis | Apr. 7, 1959 |